Figure 1:
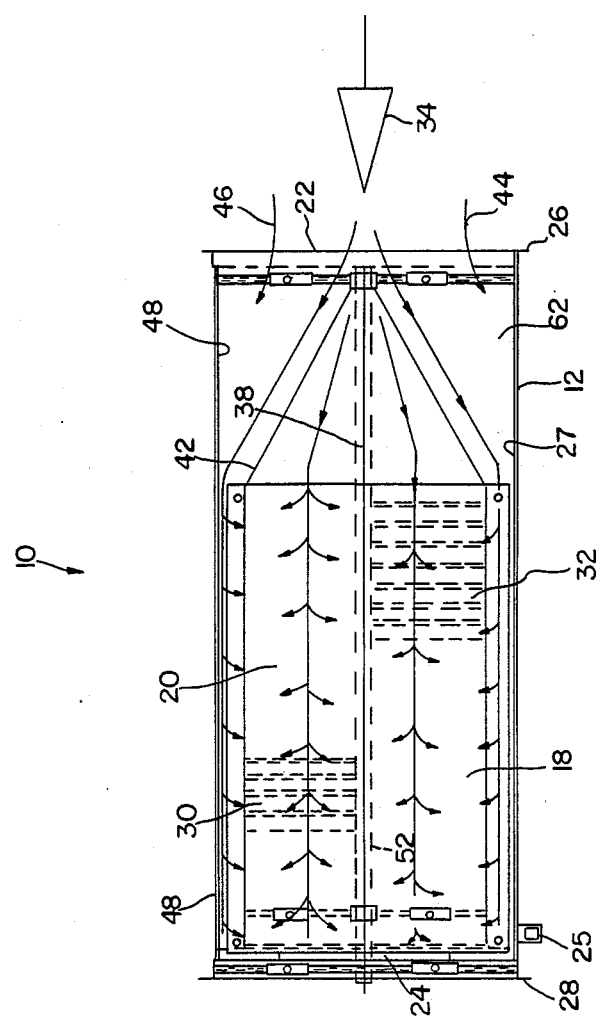

United States Patent [19]

Gutermuth

[11] Patent Number: 4,902,317
[45] Date of Patent: Feb. 20, 1990

[54] PURIFYING APPARATUS FOR GASEOUS FLUIDS

[76] Inventor: Paul Gutermuth, Augustastrasse 48 D 6456, Langenselbold, Fed. Rep. of Germany

[21] Appl. No.: 236,661

[22] Filed: Aug. 25, 1988

[30] Foreign Application Priority Data

Sep. 5, 1987 [DE] Fed. Rep. of Germany ... 8712092[U]
Mar. 16, 1988 [DE] Fed. Rep. of Germany ... 8803568[U]

[51] Int. Cl.⁴ ............................................. B01D 45/08
[52] U.S. Cl. .................... 55/257.2; 55/257.3; 55/326; 55/431; 55/436; 55/440; 55/DIG. 25
[58] Field of Search ............ 55/183, 185, 186, 257.2, 55/257.3, 322, 325, 326, 431, 436–446, DIG. 25

[56] References Cited

U.S. PATENT DOCUMENTS

| 768,415 | 8/1904 | Wingrove | 55/444 |
|---|---|---|---|
| 1,044,208 | 11/1912 | Luhn | 55/444 X |
| 1,602,641 | 10/1926 | Boyrie | 55/444 |
| 1,761,170 | 6/1930 | Andrews | 55/443 X |
| 1,834,180 | 12/1931 | Raymond | 55/444 |
| 1,890,294 | 12/1932 | Hughes | 55/444 X |
| 2,265,091 | 12/1941 | Tongeren | 55/442 X |
| 2,440,860 | 5/1948 | Kalmeyer | 55/446 X |
| 2,849,080 | 8/1958 | Enright | 55/442 X |
| 3,631,656 | 1/1972 | Hausberg et al. | 55/257.2 |
| 3,880,624 | 4/1975 | Arnold et al. | 55/442 X |
| 3,923,010 | 12/1975 | Chlique | 55/444 X |
| 3,958,966 | 5/1976 | Keller | 55/442 |
| 4,061,478 | 12/1977 | Hartwick | 55/440 X |
| 4,098,594 | 7/1978 | Shorr et al. | 55/443 X |
| 4,099,941 | 7/1978 | Gutermuth et al. | 55/440 X |
| 4,105,422 | 8/1978 | Kiguchi | 55/446 |
| 4,198,220 | 4/1980 | Keller | 55/442 |
| 4,251,242 | 2/1981 | Ito | 55/242 |
| 4,383,500 | 5/1983 | Lavalerie et al. | 55/444 X |
| 4,539,024 | 9/1985 | Stehning et al. | 55/443 X |
| 4,576,125 | 3/1986 | Keintzel et al. | 55/440 X |

FOREIGN PATENT DOCUMENTS

| 2483800 | 12/1981 | France | 55/442 |
|---|---|---|---|
| 560234 | 3/1944 | United Kingdom | 55/446 |

Primary Examiner—Robert Spitzer
Attorney, Agent, or Firm—Jordan B. Bierman

[57] ABSTRACT

An apparatus for purifying gaseous fluids is suggested, comprising a body surrounded by separator areas (18, 20) through which the fluids are flowing. The separator areas (18, 20) here are composed of interlacing profile sections, causing an acceleration or, resp. deceleration of the fluids flowing through.

14 Claims, 4 Drawing Sheets

PURIFYING APPARATUS FOR GASEOUS FLUIDS

DESCRIPTION

The invention relates to a device for purifying gaseous fluids like aerosols and oil sprays, by separating the contaminants existing therein, comprising at least first and second profile sections to form a separator area, being open in cross-section and trough-shaped, and arranged in two rows facing each other, where preferably the free longitudinal edges of the first profile sections are overlapping the free longitudinal edges of the second profile sections, and projections are starting at the inner surfaces and extending in longitudinal direction.

An analogous separator device is described in the European Patent Application No. 0 206 204. The profile sections as such, besides their trough-shaped structure, have a projection each starting in the crest area of the inner surface and extending in the direction of the opening of the profile section and along its longitudinal axis. This offers the advantage of building up further chambers to influence the flow speed of the fluids flowing through the separator. As a consequence hereof the separating degree is unexpectedly very much increased. Such separator devices have led to optimum results especially at the purification of cooling fluids, oil sprays, grease sprays, or quite generally of contaminated air, thus offering almost unlimited fields of application. Of course, hereby the dimension of the separating area of the profile sections being arranged in rows must be adapted to the fluid throughput. In some cases of application, however, the available space to this effect is restricted if e.g. existing arrangements shall be re-equipped with such separator devices, or in case of new installations if only a limited space is available.

It is the object of the present invention, among others, to design an apparatus for purifying gaseous fluids, i.e. a device of the above mentioned kind for separating contaminants existing in gaseous fluids, in such a manner as to provide large separator areas even at limited spatial conditions. Also facilities shall be offered for mounting compact large-area separators in existing waste air systems. Further facilities shall be offered for an easy cleaning of the separator area or, resp. the elements making it up, at the place of the apparatus. Finally, at constant waste air quantities, the flowing speed shall be adjustable with means of simple construction.

According to the invention the problem is solved substantially in that the device comprises a closed body with openings for inflow and outflow of the fluids, of which the outer surfaces, at least areawise, are defined by the separator areas, which for their part are the fluid inflow openings. According to an embodiment the body is an ashlar or a polygonal column, of which the lateral faces, at least partially, are designed as separator areas, and of which one face is a blind face and the other face of which having the fluid outflow opening. Especially the device can have a housing in which at least two of the separator areas at a distance to each other are arranged, said housing having a fluid inflow opening and a fluid outflow opening, one of which extending outside and the other one inside the space surrounded by the separator areas in the housing. In a preferred manner, four separator areas define the lateral faces of an ashlar, being arranged coaxially to the longitudinal axis of the housing preferably likewise designed as an ashlar, where the edges of the ashlars are staggered to each other for 45°. Consequently according to the invention a separator device is suggested having a housing designed as a channel, in which separator areas are coaxially arranged defining an envelope, flown through by the fluid to be cleaned, preferably from the outside.

For forming the fluid inflow opening, the room surrounded by the separator areas is preferably covered frontally, e.g. by an inflow cone, in order to avoid an unnecessary build-up of resistance for the fluids flowing into the housing, and to uniformly supply the separator areas. In order to bring about an optimum cleaning of the fluids, the longitudinal axes of the profile sections are extending vertically to the longitudinal axis of the housing being essentially congruent with the inflow direction of the fluid. By a horizontal or inclined arrangement of the separator device according to the invention, one has the additional advantage that the particles separated into the profile sections will flow downwards due to the gravity, and that preferably into the range of adjoining separator areas. There the adjacent edges of housing elements for the profiles, like frames, are acting as a collecting channel in which openings are provided for discharging the separated fluids, like e.g. oil. The fluids separated from the separator areas are collected by a bottom area or limitation, like the platform of the housing or, resp. by a support accommodating the separator areas, from which the separated fluids can be discharged via an outlet opening. Here the discharge opening is arranged in the rear part of the housing or, resp. of the support, as due to the drop of pressure, the separated particles are pressed into this rear part. The outlet as such can have a syphon.

In another embodiment of the invention to which special attention must be called, the separator areas are connected with a supporting element, like a back-up tube, extending coaxially to the longitudinal axis of the housing, which on its part is centrably and rotatably carried and supported at the inner walls of the housing. This offers the advantage that the body formed by the separator areas can be turned in order to bring a separator area into line with an inspection opening to the desired extent. Hence it follows the advantage that maintenance and care but also an inspection and/or exchange or, resp. renewing of individual profile parts can be made without removing the separator areas from the housing.

The separating apparatus according to the invention can be installed in existing waste air channel systems without necessitating any expensive reconstruction measures. In that the separator areas are extending in flow direction and nevertheless are flown through vertically or in the main vertically by the fluids to be cleaned, this results in the advantage that the cross section area of the housing to be flown through must be considerably smaller than a required separator area in order to execute the purifying of fluids. Thus separator areas of different dimensions can be received with the entrance area of the housing being the same, in that the length of the housing is varied so that different fluid throughputs can be cleaned with one structural unit only.

Though preferably four separator areas are provided for forming the side walls of an ashlar, one can, of course, use a number differing therefrom. Thus the separator areas can define the side face of a triangular column, in that case being arranged in a housing designed as a hollow cylinder. Such a type of embodiment represents an independent inventive idea of solution.

So far as the body, formed at least sectionwise by the separator areas, is not surrounded by a housing, this will especially result in the advantage of an unproblematical cleaning at the face. Thus e.g. the ashlar-shaped body can be arranged on a platform and rotating around its longitudinal axis. The air to be purified will then flow through the body from the outside, to be subsequently eliminated via an end-surface. The opposite end-surface is then designed as a blind end. By the rotatable arrangement of the body there is now a chance of cleaning the outer surfaces of the profile elements e.g. with a high-pressure cleaning apparatus. As the individual profile elements are detachably supported by generally known holding devices, e.g. such as clearly illustrated in FIGS. 1 or 21 of the European Patent Application EP-A No. 0 206 204, it is merely necessary thereafter to detach the profile elements for cleaning those areas not accessible from the outside. The interior of the body itself must not be cleaned, as the profile elements being arranged in rows are sufficiently cleaned by the gas flowing through.

According to an independently suggested solution there is further a possibility of regulating the inflow speed at constant waste air in such a manner that the separator areas are covered range-wise. To this end a covering plate can be provided extending over several individual profile elements, which plate regarding its lateral edge, being designed in such a manner that said edges will correspond to the profile elements usually arranged at the respective places, so that the same conditions are established for the outgoing air to be purified, especially for the additional chambers causing the increased separation. Further projections from the inner surface of the coverings are extending in the marginal area, which are likewise corresponding to those of the individual profile elements, and thus can also be mounted in the supports provided for said elements.

Figure 2:
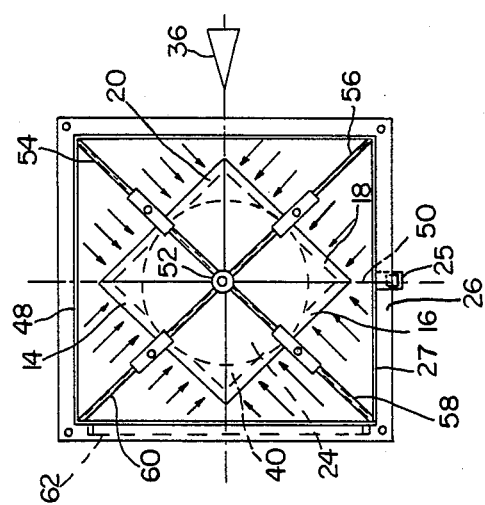
Figure 3:
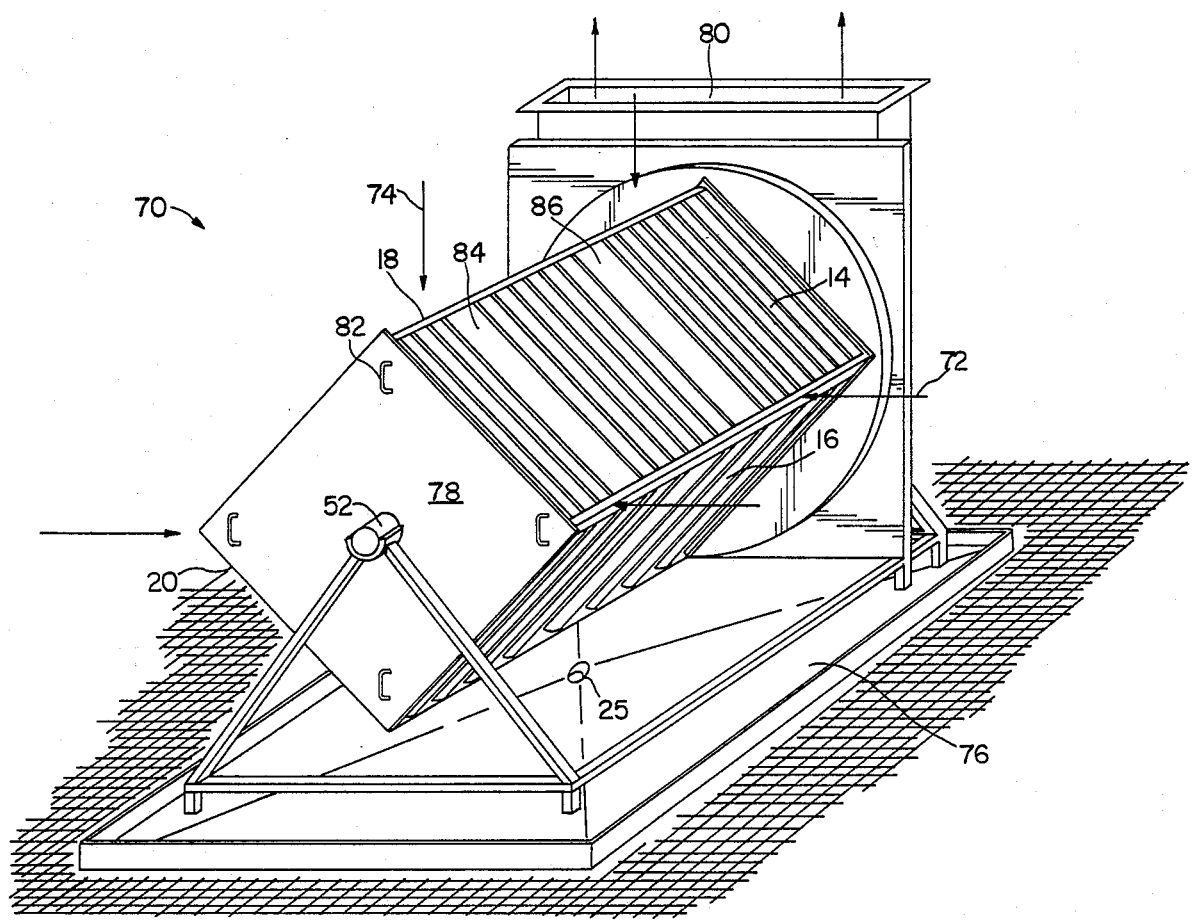
Figure 4:
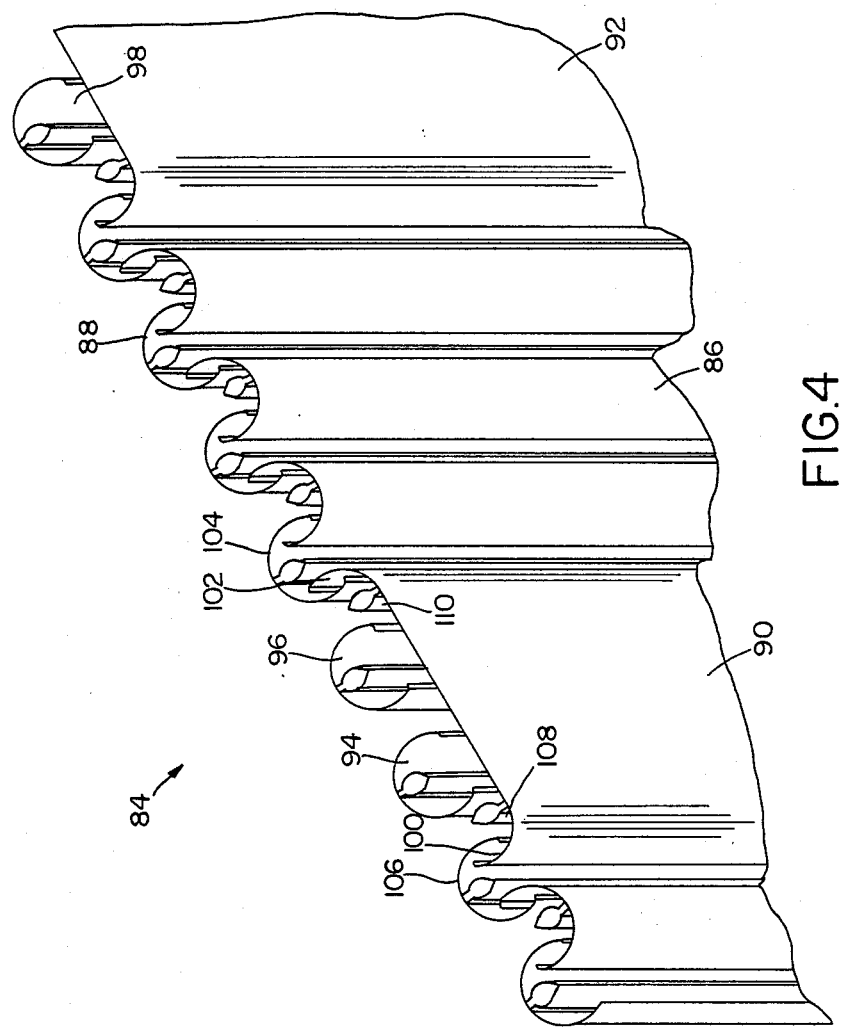
Figure 5:
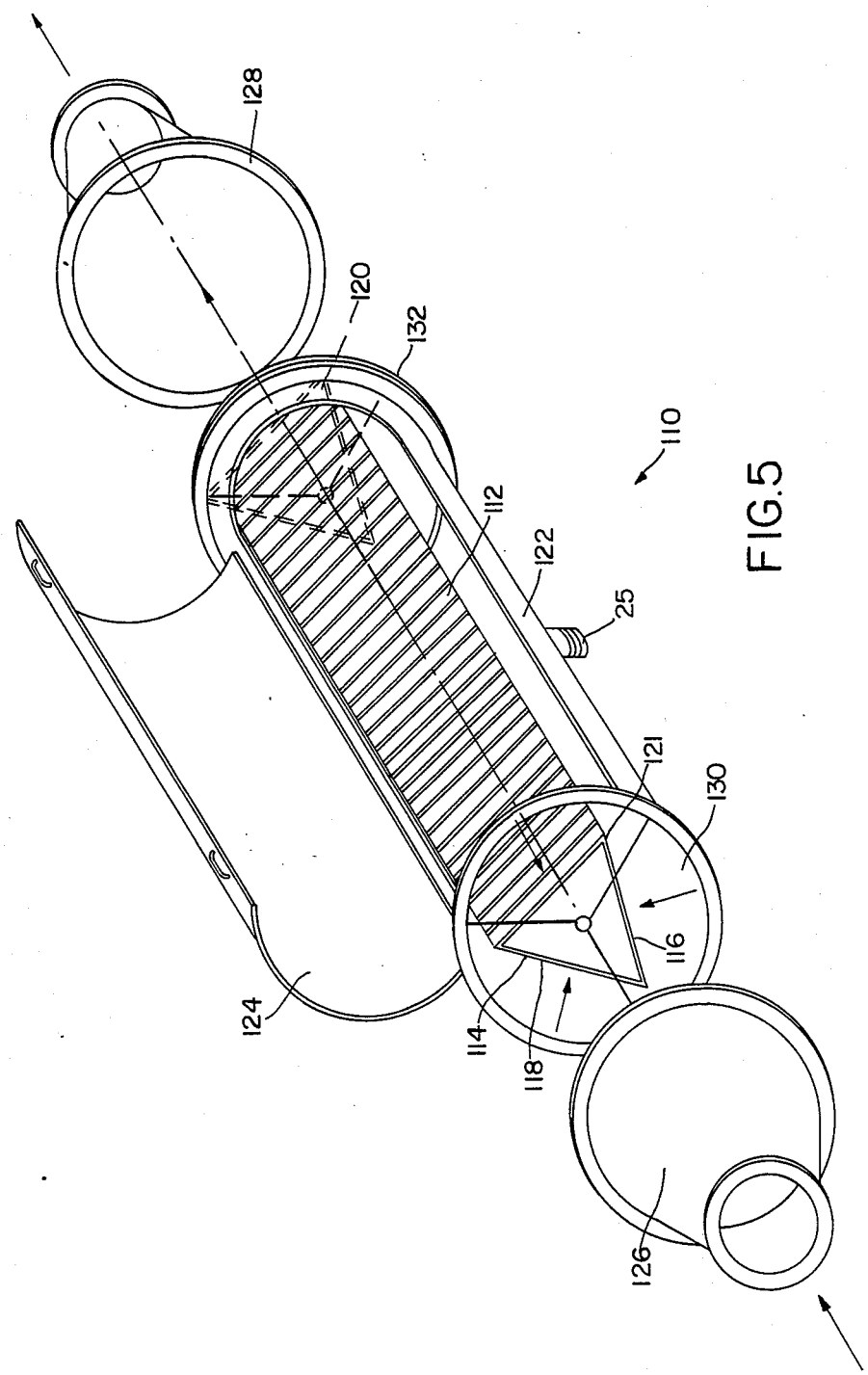

Further details, advantages and features of the invention will follow not only from the claims and the characteristics to be taken therefrom, in itself and/or in combination, but also from the following description of an embodiment example illustrated in the drawing, where FIG. 1 is a side view of an apparatus for separating fluids placed in a housing, of which the walls are not shown, FIG. 2 is a front view of the apparatus according to FIG. 1, FIG. 3 is an apparatus without housing, FIG. 4 is a detail view of a separator area, and FIG. 5 is another type of embodiment of the apparatus for separating fluids.

In the FIGS. 1 and 2 an apparatus (10) is illustrated for purifying gaseous fluids or, resp. separating contaminants existing therein, said apparatus comprising a housing (12) with separator areas (14), (16), (18), and (20) being arranged therein. The housing (12) is ashlar-shaped with open front walls being designed as entrance opening (22) and outlet opening (24). The front edges of the housing (12) have flanges (26) and (28) for installing it e.g. in an existing deaeration system, like a deaeration channel. The separator areas (14), (16), (18), and (20) are composed of trough-shaped first and second profile sections, open in cross-section and arranged in rows, where preferably the free longitudinal edges of the borders of the first profile sections are overlapping the free longitudinal edges of the borders of the second profile sections. Further projections can be arranged in the crown area of the inner surface, extending in direction of the opening of the profile section and along its longitudinal axis, thereby on the one hand forming an additional chamber influencing the flowing speed of the fluid, and on the other hand making available fixtures for supports in order to mount the individual profile sections detachably but in exact position. In other words, the profile sections arranged in rows which are defining the separator areas (14), (16), (18), and (20), are constructed in such a manner as described e.g. in the European Patent Application No. 0 206 204, and there especially in FIGS. 1 and 2. Notwithstanding this apecial type of embodiment, the European Patent Application No. 0 206 204 represents a supplementary disclosure to the present description. In other words, due to the chambers formed by the interlacing profiles and their projections, the fluids are in turn accelerated or, resp. retarded and vice versa depending upon the cross-section areas of penetration, thus causing the separating effect and consequently purifying effect.

The profile sections (30), (32), with respect to the flow direction indicated by arrows (34) and (36), are arranged in the housing (12) in such a manner that their longitudinal axes are extending vertically to the longitudinal axis (38) of the housing (12) and thus to the flow direction. This guarantees an optimum penetration of the separator areas (14), (16), (18), (20) causing the cleaning.

In order to guarantee that the separator areas (14), (16), (18), and (20) cannot be flown round, hence by-passed, the inner space (40) enclosed by the separator areas (14), (16), (18), and (20) is covered by an inflow element like an inflow cone (42), whereby the fluids to be purified (indicated by the arrows (44) and (46)) are first led along the inner surface (48) of the housing in order to flow thereafter through the separator areas (14), (16), (18), and (20), defined by the profile sections (30) and (32). Then the purified fluids enter the inner space (40) in order to subsequently leave the housing (12) via the exit opening (24).

The profile sections are secured in supporting parts (not indicated more detailed) like frames, defining the outer boundary of the separator areas (14), (16), (18), (20). The adjacent edges are then forming a so to speak collecting pipe (50) to collect particles separated in the separator areas (14), (16), (18), (20) and due to the gravity flowing to the collecting pipe, and subsequently deliver them via openings to the inner surface (27), from where the separated particles can be drained off through an outlet opening (25) provided for in the back area.

The separator areas (14), (16), (18), and (20), with their supporting parts (not specifically marked), like bands, lodging the fixtures for the profile sections (30), (32), are connected with a back-up tube (52) extending coaxially to the longitudinal axis (38) of the housing (12), which tube for its part is supported rotatably via length-adjustable tube elements (54), (56), (58), (60) and centrably on the inner walls of the housing, and that in its corners. To this effect the tube elements (54), (56), (58), and (60), being adjustable in length by means of a counter screw socket (not specifically marked), are designed in such a manner as to guarantee the desired centering of the back-up tube (52). By the rotation of the back-up tube (52) and thus that of the separator areas (14), (16), (18), (20) there is a chance of designing one side (in the embodiment example the side (62)) as an inspection cover, in order to be able to check and/or renew profile sections (30), (32) available in this area.

Consequently this results in the significant advantage that the separator areas (14), (16), (18), (20) must not be removed for inspection purposes, rather the separator areas (14), (16), (18), (20) only must be turned to the inspection opening (62) in order to be able to perform the necessary work.

Of course, packing elements (not specifically marked or illustrated) are provided within the range of the entrance and exit openings (22) or, resp. (24), in order to guarantee that the fluid stream to be cleaned is completely flowing through the separator areas (14), (16), (18), (20), so that really cleaned fluid is discharged through the outlet port (24).

The following dimensions of the apparatus (10) are indicated for an example:
Cross section of the end-surface of the ashlar-shaped housing (12): 900 to 1600 cm$^2$,
Length of the housing: 100 cm.

According to these dimensions, the total separator surface will be 8000 to 10,000 cm$^2$.

It should likewise be pointed out that one can, of course, use devices via which the moisture, hot-air and/or fluids can be passed to the individual profile elements in order to dissolve separated particles like e.g. salts or wax particles and thus remove them.

FIG. 3 shows a preferred embodiment of the invention, where the same reference numbers are used for identical elements. Contrary to the embodiment example according to the FIGS. 1 and 2, the body (70) defined by the separator areas (14), (16), (18), and (20) is not surrounded by a housing. The body (70) can rather be flown on and flown through (arrows 72 and 74 ) directly by a gas like air. To this effect the body (70) is arranged e.g. on a work platform (76), and like the embodiment example of FIGS. 1 and 2, rotatable by a shaft (52) around its longitudinal axis.

One of the end-surfaces of the body (70) showing an ashlar shape is designed as a blind surface (78), whereas the opposite end-surface (not specifically marked) is connected with an air outlet conduit (80), via which the gases having flown through the separator areas (14), (16), (18), and (20) are sucked off. Hereby it is guaranteed that the waste gas to be cleaned is exclusively penetrating the separator areas (14), (16), (18), and (20), so that purified gas is delivered to the air outlet conduit (80) to asufficient extent only.

The separator areas (14), (16), (18), and (20) are composed of profile elements, as they are described in connection with the FIGS. 1 and 2, and supplementarily by the Europen Patent Application No. 0 206 204.

By the embodiment according to FIG. 3 there is likewise a chance of cleaning the separator areas right at the face, thus at the place of installation. For this purpose it is merely necessary that the body (70) is seized e.g. by means of the handles (82) on the end-surface (78), and turned in such a manner that always one separator area is exposed e.g. to the jet of a high-pressure purifier. As the individual profile elements are detachably arranged in the separator areas (14), (16), (18), and (20), it is further possible to clean the outside of the profile elements in the inside and the inner surfaces of the profile elements on the outside, which can be reached via the opening with the purifying fluids. The outside of the profile elements on the outside, and the inner surface of the profile elements in the inside are cleaned by the purifying fluid striking on the separator area from the outside. All that is required hereto is the removal of some profile elements, as it is indicated by the empty spaces (84) and (86) in FIG. 3. The cleaning water itself is collected on that surface of the work platform (76) facing the body (70), and then discharged via the outlet (25).

FIG. 4 shows an independent solution making it possible to regulate the inflow speed at unvarying outgoing air. The illustrated detail of a separator area (84) comprises profile elements (86) and (88), like those as described above in connection with the separator areas, and also fully explained in the European Patent Application No. 0 206 204. In other words, the profile elements (88) having inner projections (not specifically marked) extending in longitudinal direction of the profile elements (86) and (88), are interlocking in order to speed up or, resp. slow down the fluids flowing through by such chamber formations, so that a separation and thus purification takes place to the desired extent.

Now the profile elements are covered area-wise by covering elements (90) and (92), so as to reduce the area serving for a passage of the fluids to be cleaned, and thus to increase the inflow speed. The coverings, behind which the shown profile elements (94), (96), and (98) can of course be removed, are curved in their marginal areas (100) and (102) according to the profile elements (86) and (88), in order to be able to engage coordinated profile elements (104) and (106). Further there are projections (108) and (110) in the marginal area, corresponding to those of the profile elements (86) and (88), so that the covering elements (90) and (92) can be received by the supports which are also supporting the profile elements (86). In other words, the geometric arrangement of the projections (108) and (110) is made in such a manner that they are projecting at the places where normally profile elements like that one having the reference number (86) can be arranged and secured.

In FIG. 5 an apparatus (110) according to the invention is shown, where the separator areas (112), (114), and (116) define the sides of a triangular column (118). One end-surface (121) is closed and the opposite one designed as an outlet (120). The triangular column is enclosed by a cylinder housing (122), so that the fluid at first will flow between the inner surface of said housing and the outer surface of the triangular column, and then flow through the separator areas (112), (114), and (116).

The housing (122) has a flap (124) so that the rotatably arranged triangular column can be serviced and cleaned.

The open front walls of the housing (130) and (132) have funnel-shaped shoulders (126) and (128), being the inlet and outlet openings for the fluid. Further the housing (122) has a discharge opening (25) in the lower crown area.

I claim:

1. An apparatus for purifying gaseous fluids by separating contaminants existing therein comprising at least a first profile section with free longitudinal edges of borders of the profile section overlapping free longitudinal edges of the borders of a second profile section, said first and second profile sections being arranged in two opposite rows open in cross-section and channel-shaped to form separator areas, and projections starting at inner surfaces of the profile section and extending in the longitudinal direction, characterized in that the apparatus comprises a closed body with inflow and outflow openings for the fluid whose outer surfaces are formed by the separator areas which acts as the fluid inflow openings.

2. An apparatus according to claim 1 characterized in that the body is an ashlar or a polygonayl column, of which the lateral faces, at least partially, are formed as separator areas, and of which one face has a blind area and a second face has the outflow opening for the fluid.

3. An apparatus according to claim 1 characterized in that the body is enclosed by a housing, that at least the separator areas of the body are at a distance to an inner surface of the housing, and that the gaseous fluid is entering the housing from the outside of the body, and leaving from a space surrounding the body.

4. An apparatus according to claim 3 characterized in that four separator areas are defining the side faces of an ashlar, being coaxially arranged to the longitudinal axis of the ashlar housing the edges of the ashlars are running reversed to each other through 45°.

5. An apparatus according to claim 3 characterized in that the separator areas are connected with a back-up element extending co-axially to the longitudinal axis of the housing, said element on its part being supported at the inner surface of the housing via struts for rotatable bearing.

6. An apparatus according to claim 3, characterized in that one section of the housing is designed as an inspection cover.

7. An apparatus according to claim 1, characterized in that three separator areas are defining the side faces of a triangular column arranged in a housing designed as a hollow cylinder.

8. An apparatus according to claim 1 characterized in that the longitudinal axises of the profile sections are extending vertically to the longitudinal axis of the body or, the housing, substantially coinciding with the inflow.

9. An apparatus according to claim 1 characterized in that the space surrounded by the separator areas is covered on the outside by an inflow element.

10. An apparatus according to claim 1, characterized in that adjacent edges of receiving elements for the separator areas are defining collecting channels, being perforated for discharging the separated fluids.

11. An apparatus according to claim 10, characterized in that the fluid separated from the separator areas is collected in the housing and is discharged to the outside via an outlet opening.

12. An apparatus according to claim 1, characterized in that penetration openings through the separator area are covered area-wise, especially for regulating the inflow speed.

13. An apparatus according to claim 12, characterized in that coverings sealing penetration openings have projections in the marginal range, which are adapted to those of the profile elements, and via which the coverings can be detachably arranged in the supports receiving the profile elements.

14. An apparatus according to claim 1 characterized in that the body is a polygonayl column, of which the lateral faces, at least partially, are formed as separator areas, and of which one face has a blind area and a second face has the outflow opening for the fluid.

* * * * *